March 4, 1969  C. C. BOYLAN  3,430,461
BLADE ADAPTER
Filed May 18, 1967
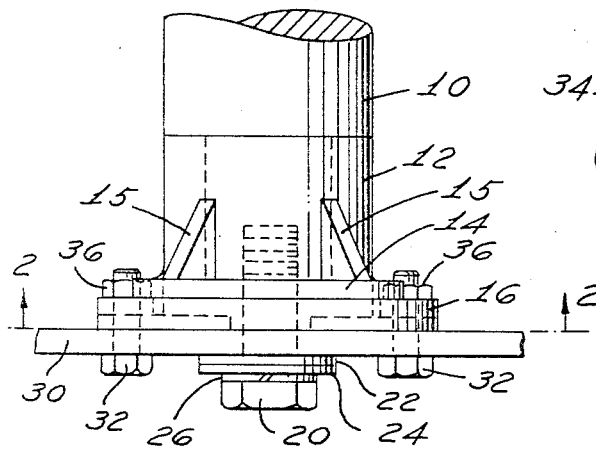
FIG.1
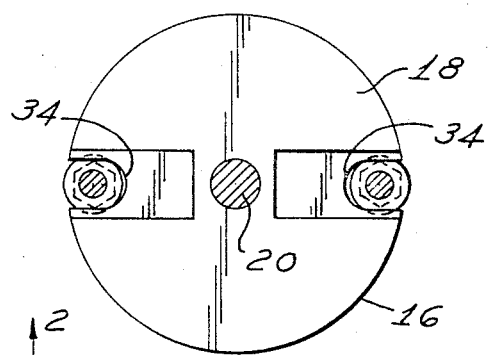
FIG.2
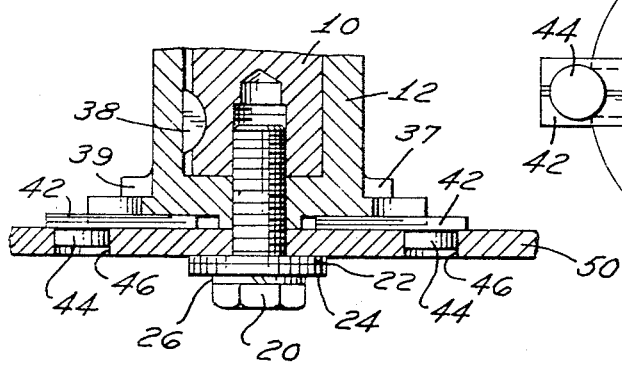
FIG.4
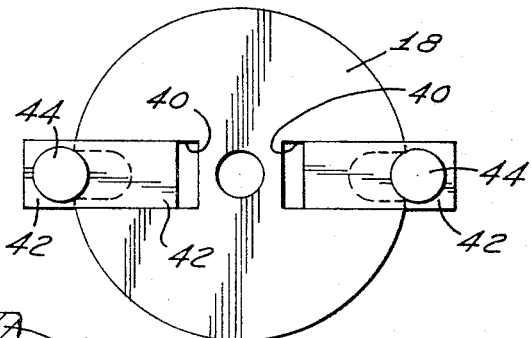
FIG.5
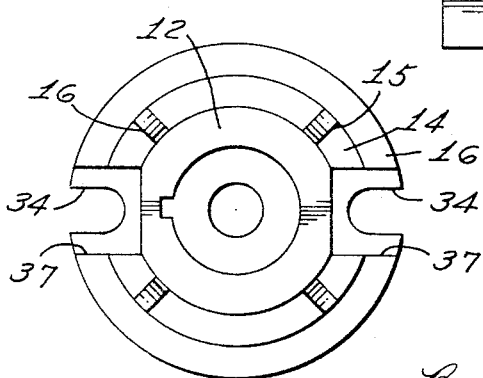
FIG.3
FIG.6
INVENTOR
CAROL CLARK BOYLAN
BY
Barnes, Kisselle, Raisch & Choate
ATTORNEYS

United States Patent Office 3,430,461
Patented Mar. 4, 1969

3,430,461
BLADE ADAPTER
Carol Clark Boylan, Cass City, Mich., assignor to Walbro Corporation, Cass City, Mich., a corporation of Michigan
Filed May 18, 1967, Ser. No. 639,539
U.S. Cl. 64—28
Int. Cl. F16d 7/02; A01d 55/18
5 Claims

ABSTRACT OF THE DISCLOSURE

An adapter unit for the purpose of fastening blades diametrically across a power shaft for a lawn mower and designed to adapt to a plurality of blades having fastening holes centrally thereof and torque transmission apertures at various distances on either side of said center, said plate being designed for direct attachment to said blade or for the transmission of torque through slidable elements which can position at varying positions relative to the center of the plate.

*Background of invention*

One of the problems in the art of rotary lawn mowers that utilize blades that revolve around a particular axis substantially in a horizontal plane is the mounting of the blades on the stub shaft of the engine. It is difficult for an engine manufacturer to make a different stub shaft for each particular purchaser of his engine and, accordingly, the present invention is directed toward an adapter device which may be mounted on the stub shaft of an engine and which will receive many different types of blades either for original equipment or replacement.

It is, therefore, an object of the invention to provide an adapter unit for motor shafts which will receive a large variety of lawn mower blades of different designs in a manner which permits the blade to be securely fastened to the shaft with a torque drive connection.

Other objects and features of the invention will be apparent in the following description and claims in which the principles of the invention and the operation are set forth together with the best mode contemplated for carrying out the invention.

Drawings accompany the disclosure and the various views thereof may be briefly described as:

FIGURE 1, a side elevation of an assembled blade.
FIGURE 2, a sectional view on line 2—2 of FIGURE 1 showing one embodiment of the invention.
FIGURE 3, a top view of the adapter shown in FIGURE 1.
FIGURE 4, a sectional view of the device showing a second embodiment of the invention.
FIGURE 5, a view of the adapter of FIGURE 4 with the blade removed.
FIGURE 6, an illustration of the device showing a reversal of adapter units for a different blade construction.

Referring to the drawings:

In FIGURE 1, a motor shaft 10 is shown, this being sometimes referred to as a stub shaft and having either a square end or a key slot in the end thereof for receiving an adapter hub 12, this hub having an extending flange 14 reinforced to the hub by gussets 15. The flange portion 14 is extended in an additional flange portion 16 which has a flat surface 18 serving as a mounting surface for cutter blades of rotary lawn mowers.

The basic hub 12 is held on the shaft by a headed bolt 20 which screws into the end of shaft 10. A fiber washer 22 backed by a steel washer 24 and a lock washer 26 are preferably utilized with the bolt to secure a blade 30 against the surface 18 of the flange 16 of the hub 12.

The blades of rotary lawn mowers of various manufacture have many different means for attachment. Most of them are provided with a central hole which will receive the bolt 20 but from this point on the blades vary. Sometimes they have a clutch slip with the face of the hub. Other times they have round holes on each side of the central hole or square holes or slots, each of these generally being of different dimensions.

It is the purpose of the present invention to provide an adapter which will accommodate most of these blades, if not all. If it is desirable that the clutching arrangement be effective, then only the clutch washers 22 and 24, together with the bolt 20, are used to secure the blade to the surface 18. In other instances, particularly for heavier work, shear pins are desirable for increasing the torque drive.

In the embodiment shown in FIGURE 1, for example, small drive bolts 32 transfix the blade and pass upwardly into the notches 34 at each side of the hub 16 there being suitable nuts 36 in recesses 37 to hold these bolts in place. These bolts are preferably formed of a soft material so that when the blade strikes an unexpected heavy obstruction, the bolts 32 will shear to allow the clutch action to retain the blade on the shaft and still permit sufficient rotation to prevent damage to the engine unit.

A secondary protection for the engine is found in the Woodruff key 38 (FIGURE 4) which creates a driving relationship between the shaft 10 and the hub 12. This key under extreme circumstances will shear to protect the engine against damage in the event of a sudden, sharp obstruction which does not shear the other drive pins or in the event the clutch relationship is frozen.

Other means for obtaining this positive drive, in addition to the clutching elements, are shown in FIGURES 4 and 5. The bottom surface 18 of the hub flange 16 has some surface slots 40 extending radially from the center thereof, these being substantially rectangular in shape. These slots receive slide plates or drive lug inserts 42 in a sliding relationship, each plate having a small lug or stud 44 adjacent one end thereof. As the parts are viewed in FIGURE 5, the studs 44 are positioned radially outwardly of the device and they are shown in assembly in FIGURE 4 with the studs inserted into holes 46 of a blade 50. These lug inserts are preferably formed of a soft material such as zinc so that a sharp force on the blade when it hits a solid object, such as a stone or a rock, will cause shearing of the studs or lugs 44 to permit the clutch action to take over to prevent damage. It is possible to reverse the position of the slide plates in the slots 40 as shown in FIGURE 6 so that the studs 44 fall near center of the disc to adapt to certain blades which have closely spaced openings. The slide plates or lug inserts are slidable, of course, in the openings so that they will adjust to many different blades.

It will thus be seen that by the use of the notches 34 in the flange 16 and by the use of the slide plates or lug inserts 42, the adapter unit will accept many different spacings for the drive holes in a variety of blades and thus permit a positive drive with a safety clutch arrangement in the event of accidental contact and sudden stoppage of the blade.

What is claimed as new is as follows:

1. An adapter unit for mounting blades on a rotary lawn mower having an extending power shaft which comprises:
   (a) a disc mountable on said shaft having diametrically opposed notches in the periphery thereof and slide recesses formed in an outer face on a diameter of said disc opening from the periphery thereof toward the center, and
   (b) slide plates in said recesses positionable at varying points in said recesses, said slide plates having projecting therefrom locating lugs to be received in the holes of a mower blade to impart torque thereto from said adapter.

2. An adapter unit for mounting blades on a rotary lawn mower having an extending power shaft which comprises:
(a) a means mountable on a shaft in a driving relation thereto having a relatively flat mounting surface in a plane perpendicular to the axis of a mounting shaft, and
(b) means engaged with and slidable radially at said surface having an axial projection positionable at one of many varying radial positions to engage a blade positioned on said surface to impart a torque drive thereto.

3. An adapter unit as defined in claim 2 in which said surface has a radial slot, and said means engaged with and slidable radially at said surface comprises a lug slidable in said slot in one of two end-for-end positions.

4. An adapter unit as defined in claim 2 in which said means mountable on a shaft comprises a hub having one or more notches in the periphery of said mounting surface.

5. An adapter unit for mounting blades on a rotary lawn mower having an extending power shaft which comprises:
(a) a flanged hub having a central recess at one end to receive and engage a power shaft and having a smooth surface at the flanged portion at the other end normal to the axis of the hub, said flanged portion having one or more radial notches to receive drive bolts for a blade, said surface having one or more radially extending recesses,
(b) a lug insert slidable in each said recess to any one of a plurality of radial positions in any one of each end-for-end position, and a projection on said lug insert on one side and near one end thereof positioned to project in an axial direction of said hub to engage a recess of a blade in a torque driving relation, and
(c) means engageable with said hub to hold a blade and each said lug insert in place against said surface and said hub.

References Cited

UNITED STATES PATENTS

| 1,380,330 | 5/1921 | Ziegler | 64—10 X |
| 2,056,785 | 10/1936 | Hanna | 64—28 |
| 2,828,161 | 3/1958 | Whitney | 64—28 X |
| 2,875,569 | 3/1959 | Sauer | 56—295 |
| 3,044,241 | 7/1962 | Snider | 56—295 |

HALL C. COE, *Primary Examiner.*

U.S. Cl. X.R.

56—295; 287—53